United States Patent
Wang et al.

(10) Patent No.: US 7,286,343 B2
(45) Date of Patent: Oct. 23, 2007

(54) LOCK MECHANISM FOR DIGITAL DISC PLAYER

(75) Inventors: He-Li Wang, Shenzhen (CN);
Chin-Chu Lin, Tu-Cheng (TW);
Wen-Jie Bao, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsin (TW)

( * ) Notice: Subject to any disclaimer, the term of this patent is extended or adjusted under 35 U.S.C. 154(b) by 153 days.

(21) Appl. No.: 11/219,486

(22) Filed: Sep. 2, 2005

(65) Prior Publication Data
US 2006/0050476 A1    Mar. 9, 2006

(30) Foreign Application Priority Data
Sep. 3, 2004    (CN)    .................. 2004 2 0083795 U

(51) Int. Cl.
*G01F 1/16*    (2006.01)
(52) U.S. Cl. .............. 361/683; 361/679; 720/610; 720/639; 720/655; 360/97.01; 360/97.08; 292/201
(58) Field of Classification Search ................ 361/683, 361/679–682; 720/610, 639, 655, 651, 692; 292/201; 369/75, 11, 79, 200; 360/97.01, 360/99.08, 99.09, 99.02–99.06, 96.6, 137; 70/78–80, 102, 159; 206/1.5
See application file for complete search history.

(56) References Cited

U.S. PATENT DOCUMENTS

| | | | | |
|---|---|---|---|---|
| 6,717,902 B2 * | 4/2004 | Huang | ................... | 720/657 |
| 6,731,580 B1 * | 5/2004 | Sato et al. | .............. | 720/655 |
| 6,775,836 B2 * | 8/2004 | Joung | .................. | 720/639 |
| 6,826,764 B2 * | 11/2004 | Fujisawa | ................ | 720/610 |
| 6,941,568 B2 * | 9/2005 | Huang | ................... | 720/639 |
| 7,024,674 B2 * | 4/2006 | Shepherd et al. | ......... | 720/692 |
| 7,097,215 B2 * | 8/2006 | Chen | .................... | 292/201 |

FOREIGN PATENT DOCUMENTS

| | | | |
|---|---|---|---|
| CN | 99235122.7 Y | | 4/2000 |
| CN | 01274725.4 Y | | 2/2003 |
| JP | 406259949 A | * | 9/1994 |
| JP | 4-81810663 A | * | 7/1996 |
| JP | 409297985 A | * | 11/1997 |
| JP | 0200299570 A | * | 10/2000 |
| JP | 02002208207 A | * | 7/2002 |

* cited by examiner

*Primary Examiner*—Michael Datskovskiy
(74) *Attorney, Agent, or Firm*—Morris Manning Martin LLP; Tim Tingkang Xia, Esq.

(57) ABSTRACT

A digital disc player includes a main body, a lid pivotally connected to the main body, and a latch mounted on the main body. The lid defines a recessed portion at one corner thereof and a hook is formed at the recessed portion. The latch includes a base through which the latch mounted on the main body, an end portion capable of moving in a horizontal direction relative to the base. When the lid is in a closed position, the hook engages the end portion. When the lid is in an open position, the hook exits from the end portion.

14 Claims, 6 Drawing Sheets

LOCK MECHANISM FOR DIGITAL DISC PLAYER

BACKGROUND OF THE INVENTION

1. Field of the Invention

This invention is related to digital disc players, and particularly to a lock mechanism for a digital disc player.

2. General Background

A conventional lid-type digital disc player includes a lid pivotably hinged on a main body. A lock assembly is provided to keep the lid closed, and to open the lid when needed. Conventional types of lock assemblies include mechanical lock assemblies, electrical lock assemblies, electromagnetic lock assemblies, etc. A number of different kinds of mechanical lock assemblies for a digital disc player have been developed. In a typical disc player having a mechanical lock assembly, a lid pivotally connected to a main body has a protuberant hook formed thereon. The main body forms a catch corresponding to the protuberant hook. The catch extends upwardly from a top surface of the main body. The catch defines a slot for receiving the protuberant hook. At least one spring is disposed between the lid and the main body. When the lid is rotated down, the spring is compressed, and the protuberant hook engages the catch. The lid is thus firmly held in a closed position. When the lid is further depressed, the hook is separated from the catch, and the spring decompresses and applies force on the lid. Therefore, the lid is driven to an open position. However, a lot of components may be needed to open and close the lid, and the catch is liable to interfere with a disc being loaded onto a disc tray of the main body, and the disc may be scratched.

Therefore, a heretofore unaddressed need exists in the industry to address the aforementioned deficiencies and inadequacies.

SUMMARY

A digital disc player includes a main body, a lid, and a latch. The lid is pivotally connected to the main body, and defines a recessed portion at one corner thereof, and forms a hook at the recessed portion. The latch is mounted on the main body, the latch includes a base through which the latch mounted on the main body, and a touch portion having an end portion. The touch portion is capable of moving in a horizontal direction relative to the base. When the lid is in a closed position the hook engages the end portion. When the lid is in an open position, the hook exits from the end portion.

Other systems, methods, features, and advantages will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Figure 1:
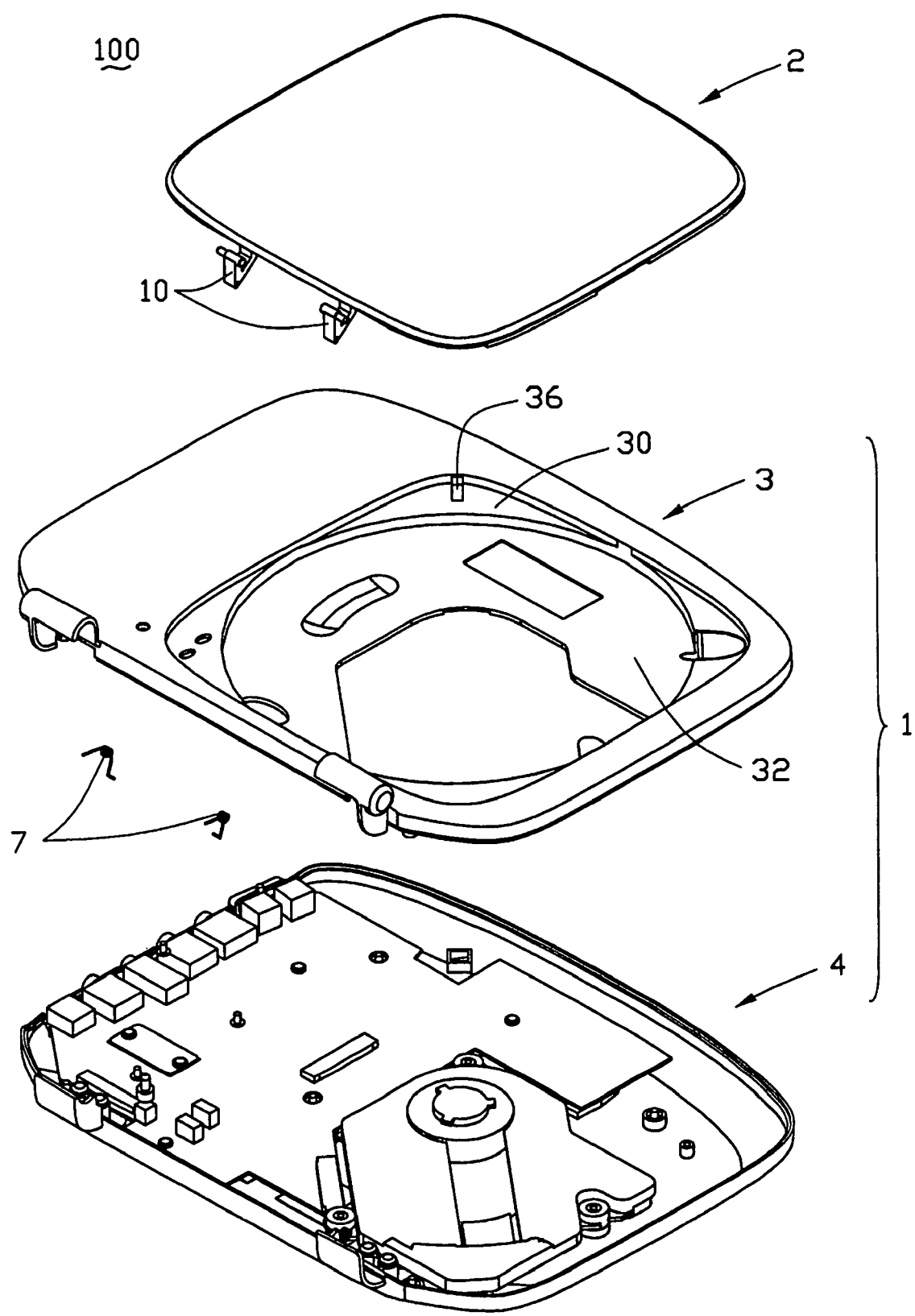
FIG. 1 is an exploded, isometric view of a digital disc player with a lock mechanism in accordance with a preferred embodiment of the present invention, the digital disc player comprising a top piece, a lid and a latch.
Figure 2:
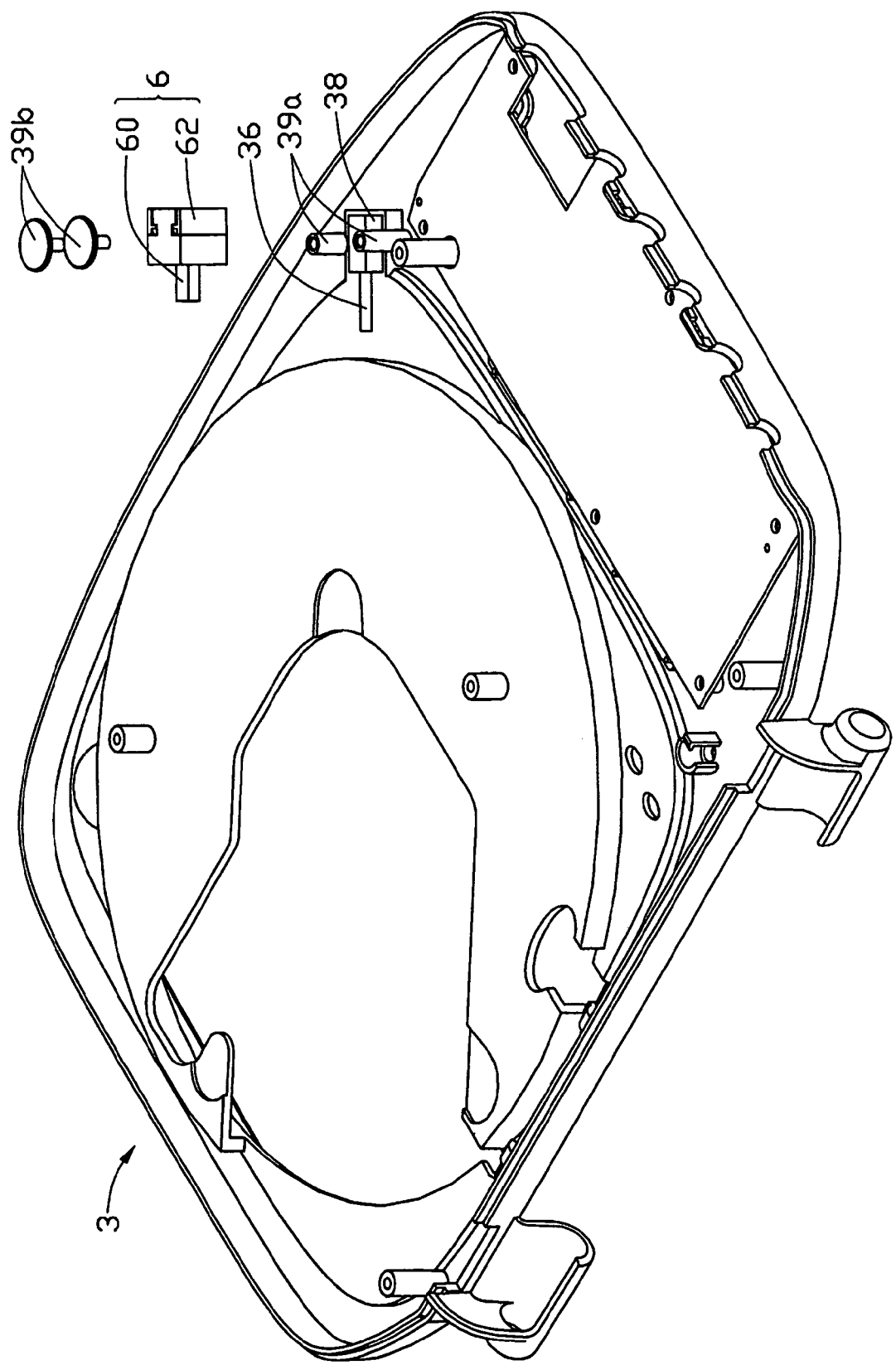
FIG. 2 is an enlarged, inverted, exploded view of the top piece of the digital disc player of FIG. 1.

Referring to FIG. 1 and FIG. 2, a digital disc player 100 as a media player includes a main body 1 and a lid 2. The main body 1 includes a top piece 3, a bottom piece 4, a latch 6 as a first engagement means mounted on the top piece 3, and a pair of resilient pieces 7 disposed between the top piece 3 and the lid 2. The top piece 3 is connected to the bottom piece 4 with fastening means such as screws. The top piece 3 includes a first housing 30 for housing the lid 2, and a second housing 32 for housing a disc (not shown). The first housing 30 defines a slot 36 at one corner thereof. The top piece 3 further defines a groove 38 near the slot 36, the groove 38 corresponding to the latch 6. A pair of posts 39a extends down from the top piece 3 at two opposite sides of the groove 38 respectively. The groove 38 is for receiving the latch 6, and the posts 39a are for fixing the latch 6 therebetween with the aid of a pair of screws 39b. In the illustrated embodiment, each of the resilient pieces 7 is a coil spring with two opposite extending ends.

Figure 3:
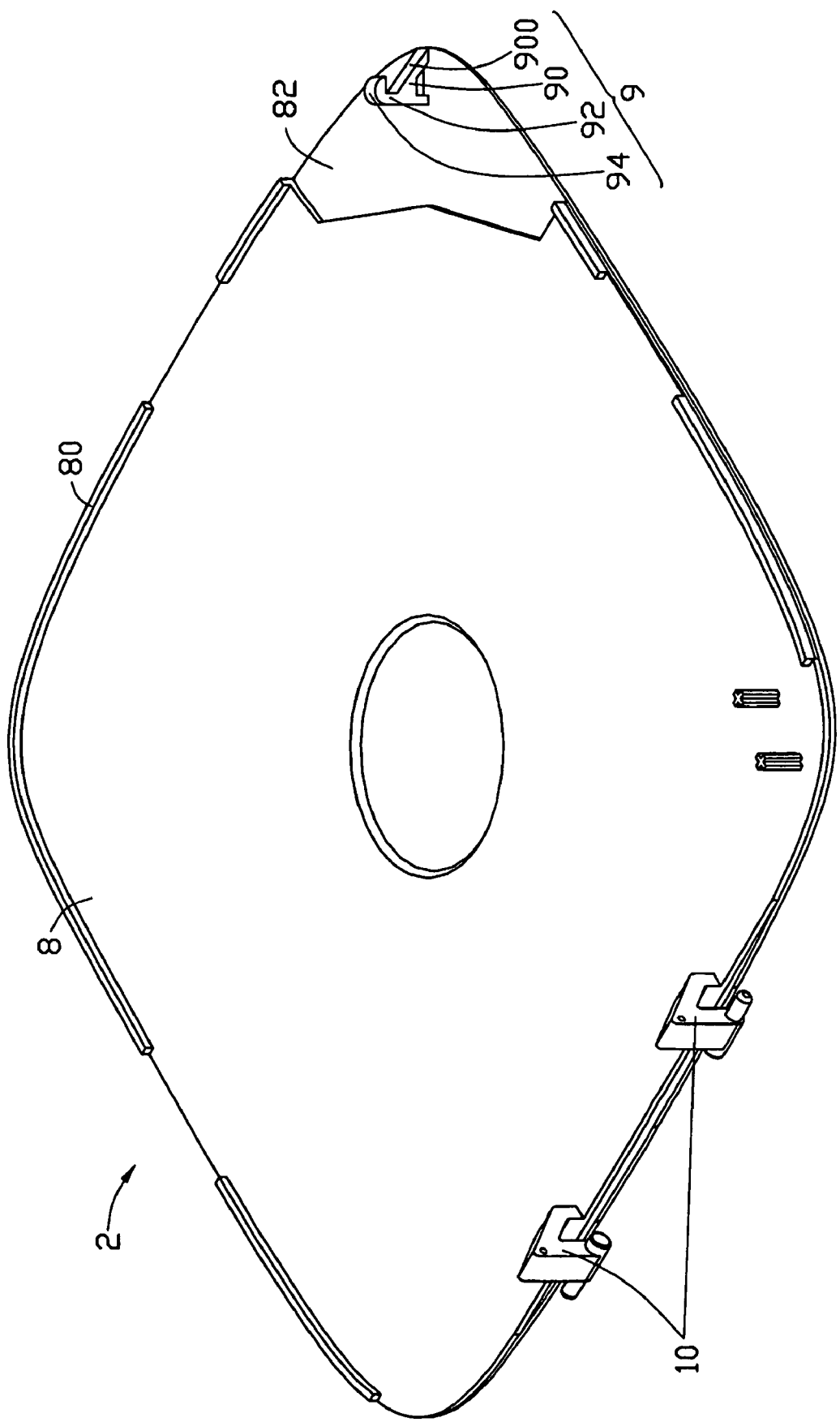
FIG. 3 is an enlarged, inverted, view of the lid of the digital disc player of FIG. 1.
Figure 4:
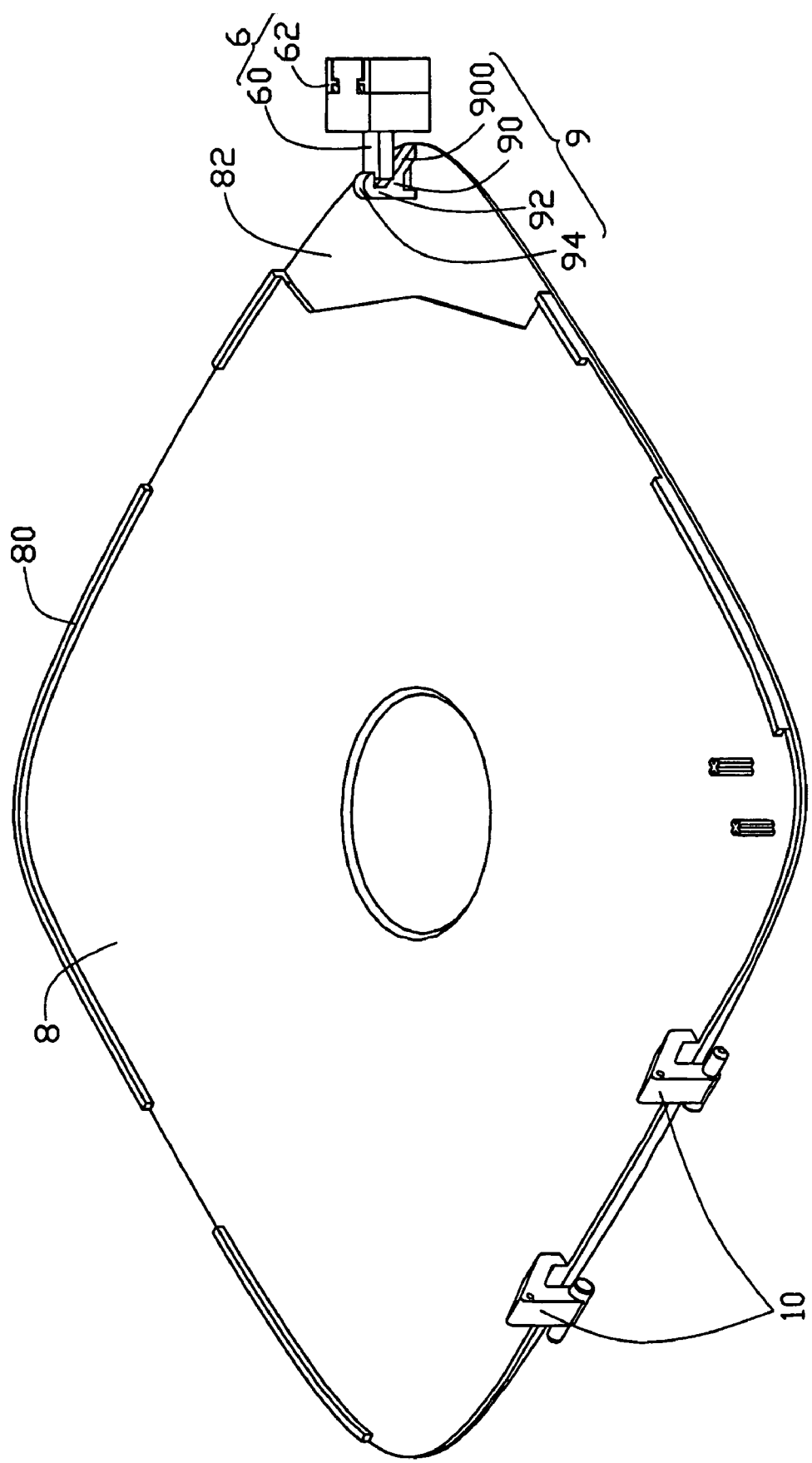
FIG. 4 is similar to FIG. 3, but also showing the latch of the digital disc player engaged with the lid, in a position corresponding to a closed position of the lid.

Referring also to FIG. 3 and FIG. 4, the lid 2 is substantially rectangular or square, and includes a lid body 8, a hook 9 as a second engagement means and a pair of hinges 10. The hinges 10 extend from a back edge portion of the lid body 8. The lid 2 can thus be pivotally connected to the main body 1 via the hinges 10. The other edge portions of the lid body 8 form a plurality of protruding bars 80 thereon. Therefore, a gap is formed between the lid body 8 and the first housing 30 when the lid 2 is pressed down to a closed position. A recessed portion 82 is formed at a front corner of the lid body 8. The hook 9 is formed on the recessed portion 82, so that the hook 9 is capable of being engaged in the slot 36. The hook 9 includes a securing portion 90, a crook portion 94, and a connecting portion 92 interconnecting the securing portion 90 and the crook portion 94. The securing portion 90 includes a press portion 900. In the exemplary embodiment, the securing portion 90 is triangular, with the press portion 900 comprising an inclined side of the triangular securing portion 90.

Figure 5:
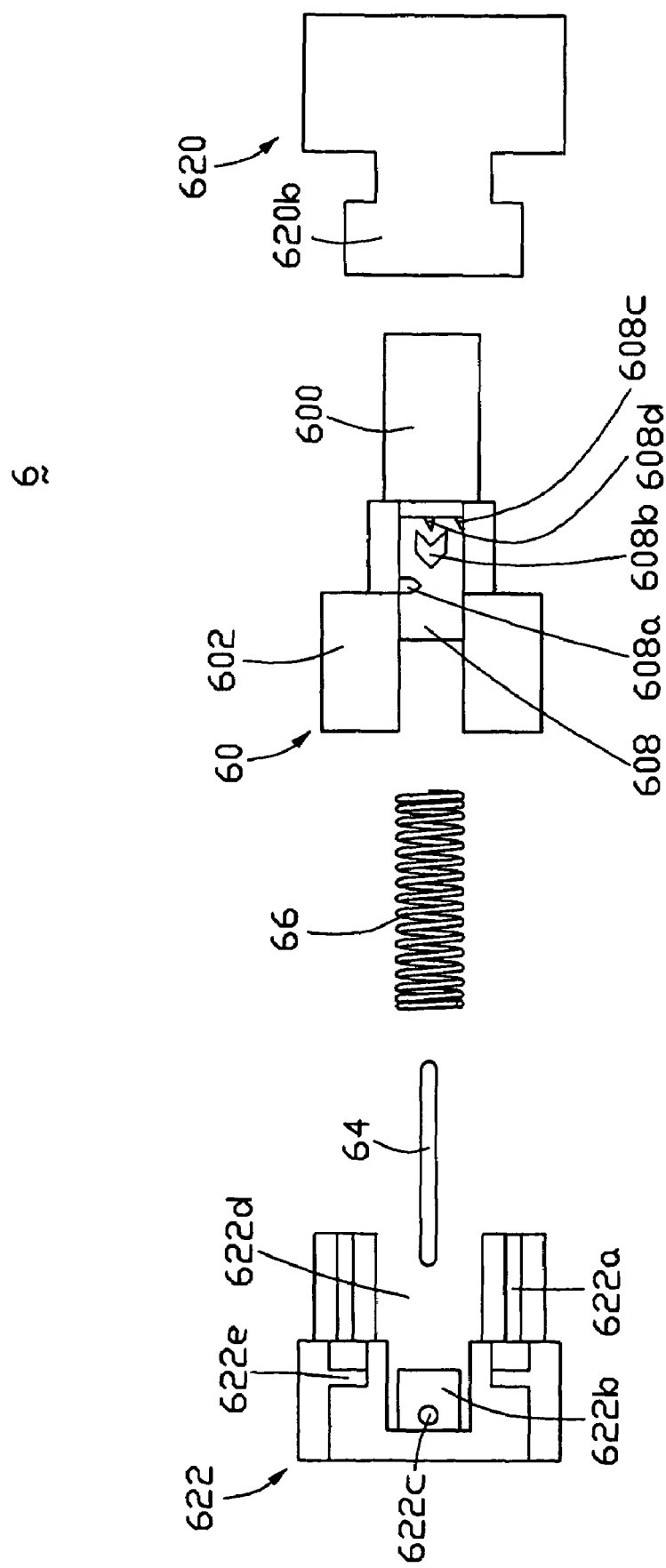
FIG. 5 is an enlarged, exploded, top plan view of the latch of the digital disc player.
Figure 6:
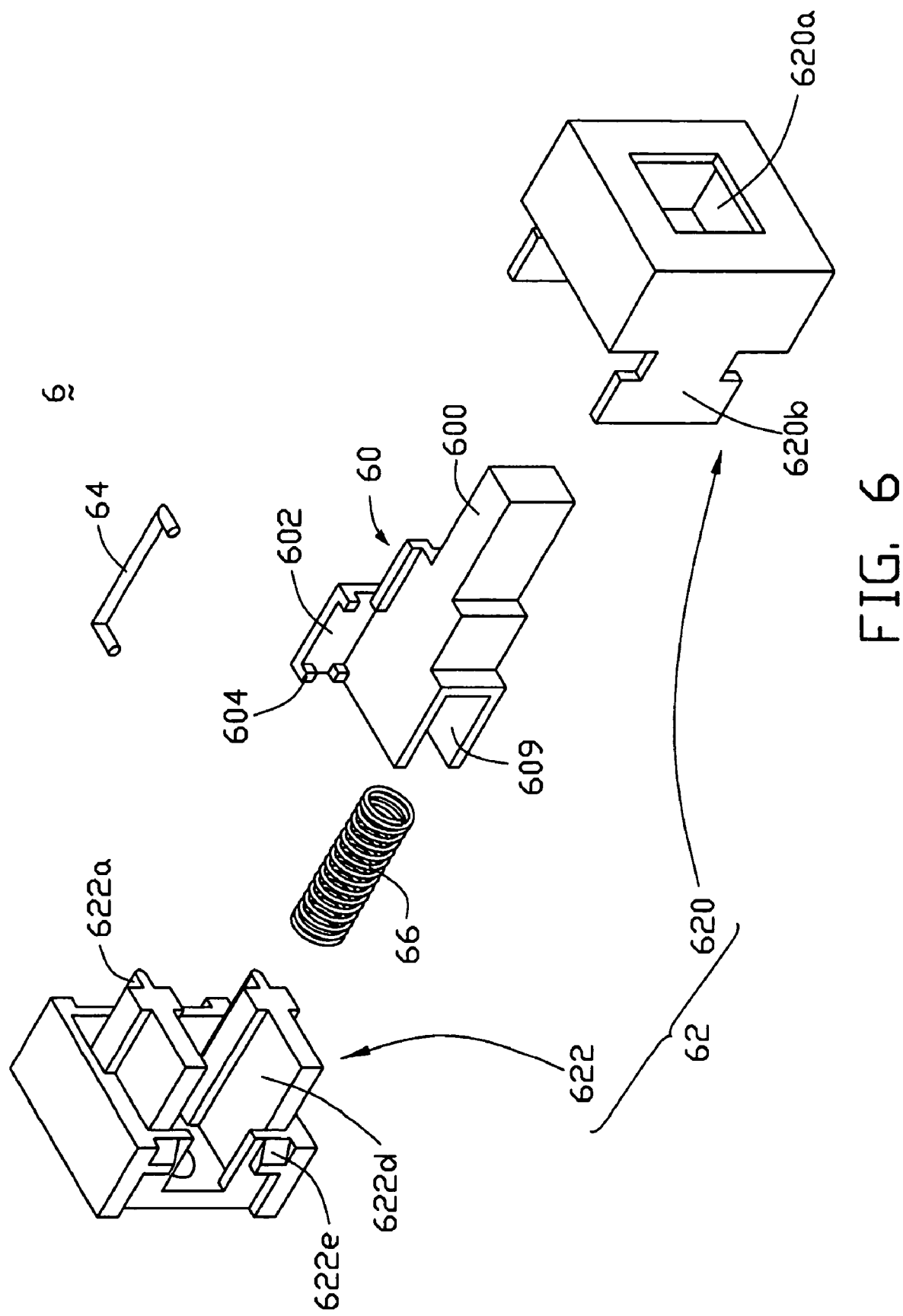
FIG. 6 is an enlarged, exploded, isometric view of the latch of the digital disc player.

Referring also to FIG. 5 and FIG. 6, the latch 6 includes a touch portion 60, a two-part base 62, a pitman 64, and a spring 66. The touch portion 60 includes an end portion 600 extending inwardly from one end thereof, and a pair of slide-blocks 602 symmetrically formed at two opposite sides of a top surface thereof. At least one block 604 extends downwardly from at least one side edge portion of each slide-block 602. A first space 608 and a second space 609 are defined in an end portion (not labeled) of the touch portion 60 that is opposite the end portion 600. The first space 608 is above the second space 609. A first protuberance 608a, a second swallow-tailed protuberance 608b, a third protuberance 608c, and a fourth protuberance 608d extend into the first space 608.

The base 62 includes a first part 620 and a second part 622. An opening 620a is defined in an end wall of the first part 620. A pair of extension plates 620b extends coplanarly from outside edges of top and bottom walls of the first part 620. The second part 622 includes a pair of parallel leaders 622a corresponding to the slide-blocks 602, a protruding block 622b defining an aperture 622c therein, a third space 622d corresponding to the second space 609, and a pair of wedges 622e. When the latch 6 is assembled, the slide-blocks 602 are slidably engaged on the leaders 622a, and can be guided to slide along the leaders 622a. One end of the pitman 64 (hereafter named the "fixing end") is pivotably engaged in the aperture 622c, while the other end of the pitman 64 (hereafter named the "free end") is movably located in the first space 608. The spring is mounted between the second space 609 and the third space 622d. The wedges 622e are snappingly wedged into cutouts (not labeled) of the extension plates 620b, such that the end portion 600 protrudes out through the opening 620a. The first and second parts 620, 622 of the base 62 are thus firmly held together.

Referring also to FIG. 2 and FIG. 4, when the latch 6 is mounted on the top piece 3, the base 62 is firstly fitted in the groove 38. Then the screws 39 are screwed onto the posts 39a, so that heads (not labeled) of the screws 39 fix the base 62 in position. The end portion 600 of the touch portion 60 is movably located in the slot 36.

When the lid 2 is in a closed position, by depressing the corner on which the hook 9 is disposed, the corner is slightly deformed due to existence of the gap between the lid 2 and the first housing 30. The press portion 900 is thus driven to move downwardly along with the corner, and applies a horizontal component force on the end portion 600 of the latch 6. The touch portion 60 moves from the first part 620 to the second part 622, with the slide-blocks 602 sliding along the leaders 622a. Therefore the free end of the pitman 64 moves anti-clockwise (as viewed in FIG. 5) around the second protuberance 608b, due to blocking by the first protuberance 608a. The free end of the pitman 64 moves from a gap between the second protuberance 608b and the third protuberance 608c to a gap between the third protuberance 608c and the fourth protuberance 608d. At this time, the touch portion 60 reaches its farthest displacement, and the spring 66 is most compressed. The end portion 600 exits from the hook 9, and the spring 66 partially decompresses and applies force to the touch portion 60. The touch portion 60 moves toward the second part 622. Therefore the free end of the pitman 64 moves from the gap between the third protuberance 608b and the fourth protuberance 608d to a gap between the second protuberance 608c and the fourth protuberance 608d, and stops at the indented swallow-tailed end of the second protuberance 608b. Accordingly, the lid 2 is driven to an open position by the resilience of the resilient pieces 7.

When the lid 2 is pressed toward a closed position, the press portion 900 is driven to move downward, and applies a horizontal component force to the end portion 600. The touch portion 60 moves toward the second part 622. Therefore the free end of the pitman 64 exits from the indented swallow-tailed end of the second protuberance 608b, the touch portion 60 reaches its farthest displacement again, and the hook 9 is engaged in the slot 36. Then the spring 66 decompresses, and the free end of the pitman 64 moves toward a gap between the first protuberance 608a and the second protuberance 608b and finally reaches its original position. Therefore the hook 9 engages the end portion 600, and the lid 2 is firmly held in the closed position.

Since the latch 6 is arranged at a back surface of the top piece 3, so the latch 6 is not liable to interfere with a disc being loaded onto a disc tray of the main body 1. Thereby, the disc is free of being scratched. Besides, only the latch 6 and the hook 9 are needed to perform opening and closing of the lid 2, the structure of the whole player 100 can be very tight and compact.

The embodiments described herein are merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims that follow, and their equivalents.

We claim:

1. A digital disc player, comprising:
   a main body;
   a lid pivotally connected to the main body, the lid defining a recessed portion at one corner thereof, and comprising a hook at the recessed portion; and
   a latch mounted on the main body, the latch comprising a base through which the latch is mounted on the main body, and a touch portion having an end portion and being capable of moving in a horizontal direction relative to the base, wherein when the lid is in a closed position, the hook engages the end portion, and when the lid is in an open position, the hook exits from the end portion.

2. The digital disc player as claimed in claim 1, wherein the hook is triangular.

3. The digital disc player as claimed in claim 1, wherein the main body defines a slot corresponding to the hook and the end portion.

4. The digital disc player as claimed in claim 1, wherein the main body defines a groove in which the base is mounted.

5. The digital disc player as claimed in claim 1, wherein the base comprises a first part and a second part held together with the first part, the touch portion is accommodated between the first part and the second part, and the touch portion moves relative to the base with the end portion protrudes out though an opening of the first part.

6. The digital disc player as claimed in claim 5, wherein the latch further comprises a spring connected between the second part and the touch portion.

7. The digital disc player as claimed in claim 1, further comprising at least one resilient piece connected between the lid and the main body, for automatically opening the lid due to a resilience of the at least one resilient piece.

8. The digital disc player as claimed in claim 1, wherein the lid further comprises a plurality of bars so as to form a gap between the lid and the main body.

9. A media player comprising:
   a main body of said media player defining a functional side thereon, a first engagement means defined in said main body next to said functional side; and
   a lid connectively engagable with said main body, said lid movable relative to said main body between a first position thereof where said lid abuts against said side of said main body to shield said side, a second position thereof where said lid moves away from said main body to reveal said side, and a third position thereof where said lid moves further into said main body than said first position thereof, a second engagement means defined from said lid toward said side to move together with said lid and interferingly engagable with said first engagement means, said lid being firmly located in said first position thereof when said lid is urged to move from said second position thereof to said first position thereof so as to trigger engagement of said first and second engagement means due to movement of said second engagement means together with said lid, and said lid being releasable to return to said second position thereof when said lid is urged to move from said first position thereof to said third position thereof so as to trigger disengagement of said first and second engagement means due to movement of said second engagement means together with said lid.

10. The media player as claimed in claim 9, wherein said first engagement means is a latch and said second engagement means is a hook.

11. The media player as claimed in claim 9, wherein said movement of said second engagement means along a first direction is used to trigger reactive movement of said first engagement means along a second direction different from said first direction.

12. The media player as claimed in claim 11, wherein said first direction of said second engagement means is perpendicular to said second direction of said first engagement means.

13. A method to operate a media player, comprising the steps of:
   movably attaching a lid of a media player to a main body of said media player in order for using said lid to shield a functional side defined on said main body in a close position of said lid and to reveal said side in an open position of said lid;
   providing a first engagement means and a second engagement means attachable to said main body and said lid respectively so as to allow engagement and disengagement of said first engagement means and said second engagement means during movement of said lid;
   moving said lid from said open position thereof to said close position thereof in order to fix said lid in said close position thereof due to said engagement of said first and second engagement means; and
   further moving said lid along a same direction as the above moving step in order to release said lid and allow movement of said lid from said close position thereof to said open position thereof due to disengagement of said first and second engagement means.

14. The method as claimed in claim 13, wherein said engagement and disengagement of said first and second engagement means are triggered by movement of said second engagement means along said same direction and reactive movement of said first engagement means along a perpendicular direction to said same direction.

* * * * *